United States Patent [19]
Anderson

[11] 3,956,458
[45] May 11, 1976

[54] METHOD AND APPARATUS FOR AIR PURIFICATION

[76] Inventor: Paul Brent Anderson, 744 W. 1950 South, Woods Cross, Utah 84087

[22] Filed: Nov. 16, 1973

[21] Appl. No.: 416,409

[52] U.S. Cl. .................................... 423/210; 55/6; 55/73; 55/72; 55/126; 55/134
[51] Int. Cl.² ........................................ B01D 53/34
[58] Field of Search ................ 423/210, 215.5, 230, 423/244; 55/5, 6, 107, 122, 124, 126, 134, 72, 73

[56] References Cited
UNITED STATES PATENTS

| | | | |
|---|---|---|---|
| 1,984,164 | 12/1934 | Stock | 423/210 |
| 3,194,629 | 7/1965 | Dreibelbis et al. | 423/210 |
| 3,672,126 | 6/1972 | Goettle | 55/122 |

*Primary Examiner*—Earl C. Thomas
*Attorney, Agent, or Firm*—B. Deon Criddle

[57] ABSTRACT

Apparatus for the collection and removal of mercury vapor from the air. Atmospheric air containing mercury vapor is forced by a blower through a sulfur filter, through an electrostatic precipitator, and into an iodine impregnated, activated charcoal filter. The air moving through the sulfur filter picks up sublimized sulfur and, as the resulting vapor phase sulfur passes through the electrostatic precipitator, some of it reacts with ozone formed therein to form sulfur compounds which are absorbed, along with elemental sulfur, on the iodine impregnated, activated charcoal filter. Some of the mercury vapor not removed from the air as the air is moved through the sulfur filter is removed in the electrostatic precipitator and most of the remaining mercury vapor is removed by subsequent passage through the iodine and sulfur impregnated, activated charcoal filter.

1 Claim, 2 Drawing Figures

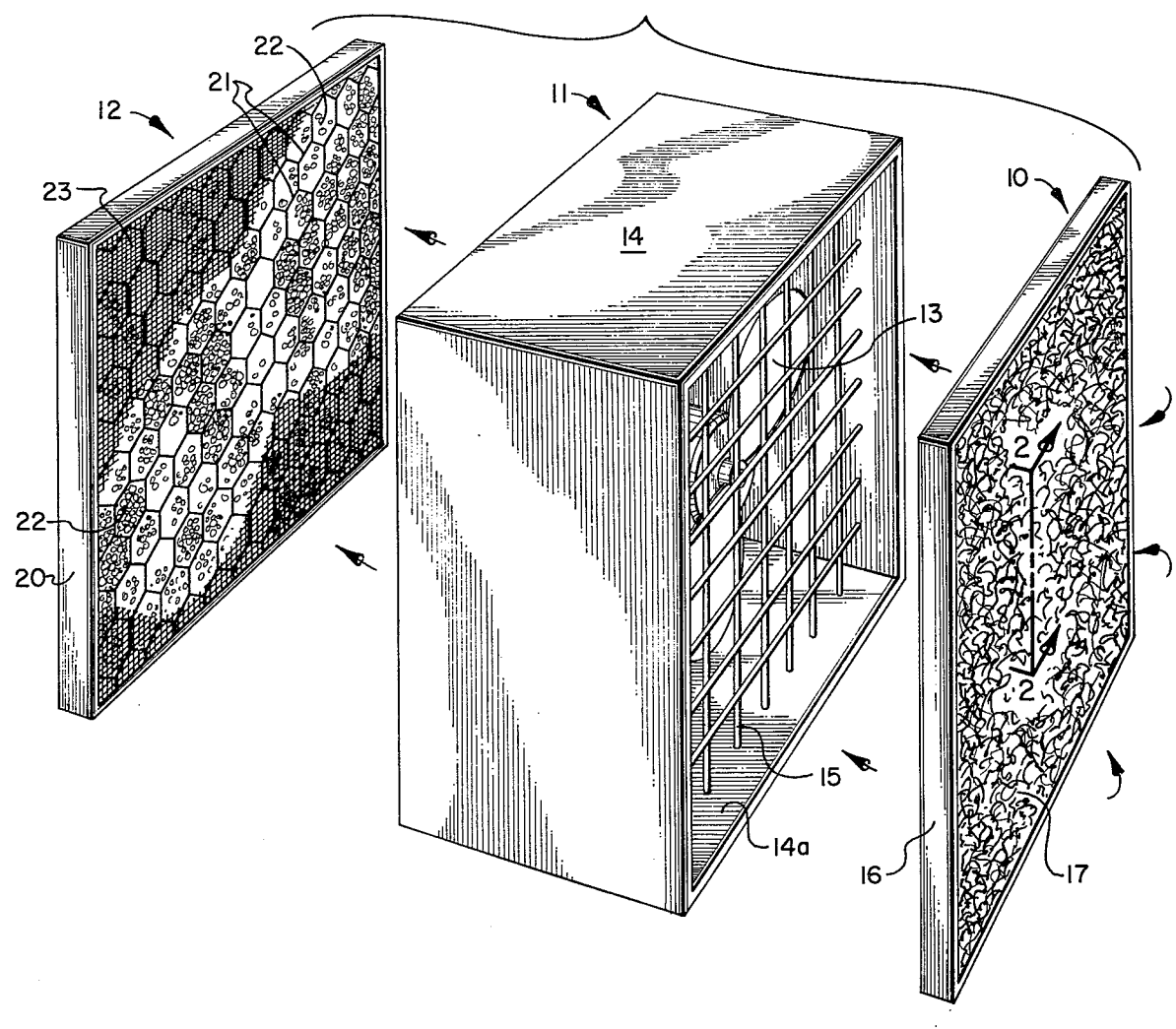
FIG 1
FIG 2
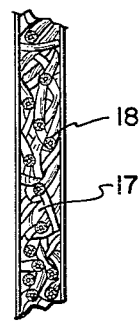

METHOD AND APPARATUS FOR AIR PURIFICATION

BRIEF DESCRIPTION OF THE INVENTION

1. Field of the Invention

This invention relates to air purification devices and is particularly concerned with such devices as may be capable of removing mercury vapor from the atmosphere. 2. Prior Art Air purifying devices have long been known. Such devices are commonly used to remove moisture, lethal gases, dust and many other types of particulate matter from the atmosphere. So far as I am aware, there has not heretofore been available a relatively low cost system that will efficiently remove mercury vapor from room atmosphere. Gas masks or other respirators have been used, of course, to provide protection for individuals in those areas recognized as having dangerously high mercury levels. I am not aware of a prior system that can be used to remove the rather small, but still dangerous amounts of mercury vapor frequently occurring in the atmosphere in the offices of dentists and others who use mercury in their day-to-day activities without the need for cumbersome gas masks or respirators. It is well recognized that mercury vapor presents a health hazard and that even exposure to small amounts, over a long period of time, can be injurious and it has now been recognized that the build-up of mercury vapor in a confined space, even from use of small amounts of mercury, can be dangerous.

SUMMARY OF THE INVENTION

It is an object of the present invention to provide a relatively low cost, compact system that can be conveniently used in the offices of dentists, and the like, to remove the mercury vapor that otherwise builds up in the air within the offices.

Other objects are to provide a system that will efficiently remove enough mercury vapor from mercury vapor laden air to reduce the mercury content of the atmosphere well below accepted safety levels.

Principal features of the invention include the filters, each of which will independently collect mercury atoms from the atmosphere and which are arranged to insure multiple collecting activities so that progressively more and more of the mercury vapor in the atmosphere is removed.

Additional objects and features of the invention will become apparent from the following detailed description, taken together with the accompanying drawing.

THE DRAWINGS

FIG. 1 is an exploded perspective view of the mercury vapor recovery system of the invention with the precipitator mesh partially broken away for clarity; and FIG. 2, a fragmentary, greatly enlarged vertical section taken on the line 2—2 of FIG. 1.

DETAILED DESCRIPTION

Referring now to the drawings:

In the illustrated preferred embodiment, the mercury vapor recovery system of the invention comprises a sulfur filter, shown generally at 10, an electrostatic precipitator, shown generally at 11, and an iodine and sulfur impregnated charcoal filter, shown generally at 12.

The electric precipitator 11 is of standard construction and, for example, may be of the type manufactured by Trion, Inc. of Sanford, North Carolina. The precipitator includes a blower having a blade 13 and a housing 14 within which the blower is mounted. An anode 15 and a cathode, not shown, are also provided in conventional fashion within the housing 14 to provide an electrically charged space through which the blower directs the surrounding air.

The sulfur filter 10 has a surrounding frame 16, that fits tightly into an open face 14a of the housing 14, so that when assembled, the air pulled into and through the precipitator by the blower must first pass through the sulfur filter. Random, spaced fibers 17 of plastic or other suitable material are held within the frame 16 of filter 10. Each fiber 17 has a coating 18 (FIG. 2) of sulfur thereon. Thus, as air is passed through the filter and into the precipitator, much of the mercury vapor in the air impinges on the sulfur coated fibers. As the mercury atoms impact on the sulfur they react with the sulfur to form mercuric sulfide molecules which apparently remain on the fibers. At the same time, it has been found that the air picks up and transports some vaporized sulfur which is then carried with the air and the mercury vapor not reacting with the sulfur in the sulfur filter into the electronic precipitator.

As the air moves through the positive grid making up the anode 15 of the precipitator at least one electron is stripped from many of the mercury atoms being carried and the anions formed are then attracted to the cathode (not shown) of the precipitator, where they gain back the electron and tend to amalgamate with the cathode.

While in the precipitator, a small percentage of the vapor phase sulfur carried by the air reacts with ozone created by the high electrical potential within the precipitator to form sulfur components which, along with remaining elemental sulfur vapor, are then discharged with the air from the precipitator into the charcoal filter 12.

Charcoal filter 12 has a surrounding frame 20 that is adapted to fit tightly into a rear open face of the electronic precipitator and a plastic honeycomb configuration inside the frame. The cells 21 of the honeycomb and the spaces between the cells are filled with iodine impregnated granulated charcoal 22 and a mesh 23 is provided at each side of the honeycomb to hold the granules in place.

Air directed through the filter 12 has to pass through the cells 21, and during such passage, flows through and around the iodine impregnated charcoal granules. The sulfur and sulfur compounds formed in the electronic precipitator, are trapped on the charcoal and provide for further reaction with any mercury atoms passing through the filter to form additional mercuric sulfide. In addition, many of the mercury atoms entering the charcoal filter react with the iodine atoms and are trapped in the filter.

In practice, it has been found that the use of the sulfur filter, electronic precipitator and charcoal filter will efficiently remove up to 99.9 percent of the mercury vapor otherwise commonly found in dentists offices.

Although a preferred form of my invention has been herein disclosed, it is to be understood that the present disclosure is by way of example and that variations are possible without departing from the subject matter coming within the scope of the following claims, which subject matter I regard as my invention.

I claim:
1. A method of removing mercury vapor from the atmosphere comprising
moving the air containing the mercury vapor through a filter of sulfur coated fibers to remove at least part of the mercury vapor from the air;
moving the air passed through the filter of sulfur coated fibers through an electronic precipitator having an anode through which the air is passed and a cathode on which mercury anions will amalgamate to further remove part of any remaining mercury vapor from the air; and
moving the air passed through the electronic precipitator through an iodine impregnated, activated charcoal filter such that any sulfur and sulfur compounds in the air resulting from passage of the air through the filter of sulfur coated fibers and remaining mercury vapor carried by the air are at least partially removed by intimate contact with the iodine impregnated charcoal of the filter.

* * * * *